July 20, 1954  Y. V. PAATERO  2,684,446
METHOD OF AND APPARATUS FOR X-RAY PHOTOGRAPHING CURVED
SURFACES, ESPECIALLY FOR MEDICAL PURPOSES
Filed Nov. 4, 1950  2 Sheets-Sheet 1

YRJÖ VELI PAATERO
INVENTOR
By Richardson, David and Nordon
his ATTYS.

July 20, 1954  Y. V. PAATERO  2,684,446
METHOD OF AND APPARATUS FOR X-RAY PHOTOGRAPHING CURVED
SURFACES, ESPECIALLY FOR MEDICAL PURPOSES
Filed Nov. 4, 1950  2 Sheets-Sheet 2

YRJÖ VELI PAATERO
INVENTOR

UNITED STATES PATENT OFFICE 2,684,446

METHOD OF AND APPARATUS FOR X-RAY PHOTOGRAPHING CURVED SURFACES, ESPECIALLY FOR MEDICAL PURPOSES

Yrjö Veli Paatero, Helsinki, Finland

Application November 4, 1950, Serial No. 194,076

4 Claims. (Cl. 250—50)

Curved surfaces cannot be X-ray photographed by employing the customary tomographic methods. Conversely, for instance in cephalophotographing use can be made of the method developed by me for X-ray photographing teeth and according to which a fan of X-rays is passed evenly along the dental arc to a film of suitable size and form, extending from the one end of the arc to the other. Obviously the method described can be adapted for use in X-ray photographing curved surfaces other than the dental arc, more particularly for X-ray photographing the outermost layers of parts of the human body surrounded by hardened tissue as, for instance, the thorax which hitherto has been difficult to photograph, above all because of the disturbing shades caused by the hardened tissue within and on the other side of the object to be photographed.

The novelty of the instant method wherein a wall-like bunch of X-rays and the part of the human body to be photographed together with the X-ray film are moved relative each other lies in the fact that as the object to be photographed is turned around its approximate central axis a fixed bunch of rays passing through the said object is directed against the X-ray film, which is moving linearly or in conformity with the said object, the X-ray source being arranged as near the object as possible. For protecting the film from secondary rays it is advantageous to arrange between the turning object and the linearly moving film holder a stationary shielding plate made of material impermeable to X-rays and provided with a slit corresponding to the bunch of rays. The primary rays passing through the object to be photographed will then find their way to the film in the holder only through the said slit, the rest of the film being covered by the shield, for instance of lead, and consequently protected from secondary radiation. For carrying out this method it is necessary to have special devices by means of which the object to be photographed is turned relative a fixed X-ray source and around an axis disposed either horizontally, or vertically or otherwise simultaneously as the film is moved linearly relative the object and the stationary shielding plate. Hence the linearly moving film will receive a picture of that layer of the object which has the same linear speed as the film because then the points of the layer under consideration are immovable relative the film and consequently will be accurately projected onto the film irregardless of whether this layer is on the outer surface of the object or some other surface within the object.

By means of a simple device which can be secured to any turnable support, for instance a chair, it is possible to photograph for instance one half of a head which in most cases is sufficient. To a suitable point on the turnable chair is fixed an arm having arranged thereto a straight piece of film bent into the shape of a cylinder half or a parabola so that the said film is as close as possible to the part of the head to be photographed. The X-ray source is stationary and the head together with the film are turned so that the X-ray wall moves from one end of the film to the other giving a picture of the head portion closest thereto.

The invention will now be more particularly described with reference to the accompanying drawings wherein:

Fig. 1 is a perspective partly in section of one form of the device for carrying out the method according to the invention while

Figure 1:
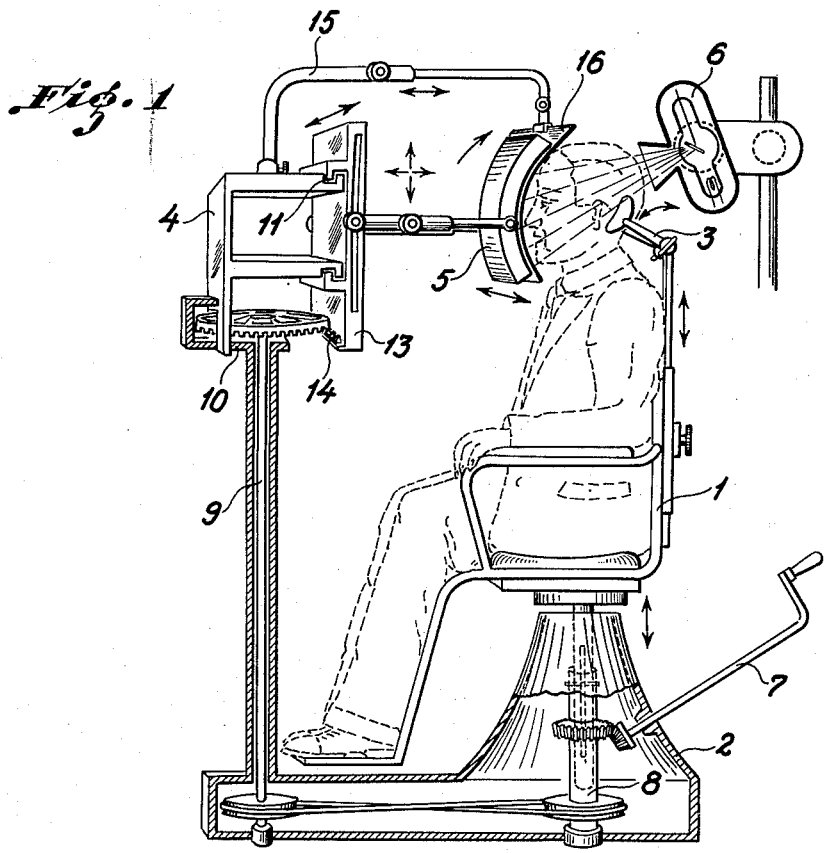
Figure 2:
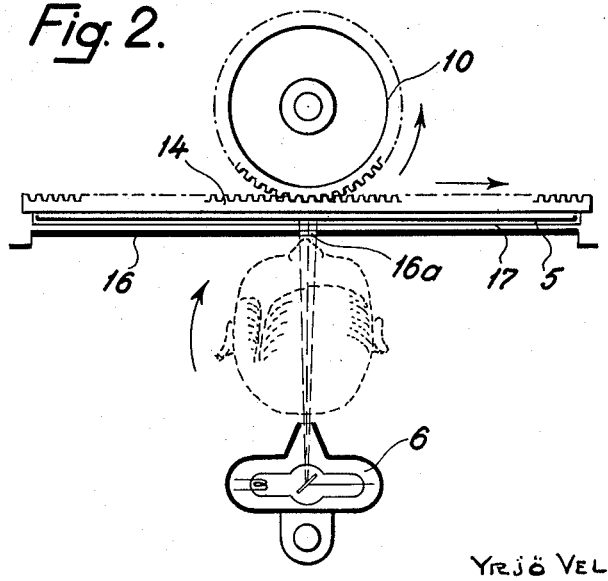
Fig. 2 is a plan view of the device shown in Fig. 1.

Referring to Fig. 1, at 1 is indicated a chair adapted to be turned on a pedestal 2 and having an adjustable nape support 3. Rigidly secured to the pedestal 2 is a frame 4 for an adjustable and linearly movable film holder 5. During the photographing process the X-ray source 6 is stationary relative the object to be photographed. The frame 4 is so connected to the chair 1 itself that on turning the chair, e. g., with the aid of a crank 7 or any other suitable turning means the holder 5 will concurrently move in a straight line. The chair can also be turned, e. g., by employing an electric motor. According to Fig. 1 the linear movement of the holder 5 is brought about by transmitting the rotary motion from the chair axis 8 over suitable gearings to the vertical axis 9 carrying at the top end thereof a horizontally disposed gear wheel 10. Advantageously the pillar encircling the axis 9 has attached thereto the frame 4 having a vertically disposed plate 13 arranged to move along guide rails 11 and having on the lower edge thereof a toothed bar 14 meshing with the said gear wheel 10. The plate 13 has attached thereto a holder 5 adjustable in all directions and advantageously concaved so as to follow the curvature of the head. For preventing secondary radiation the frame 4, by means of an arm 15, carries a shield plate 16 which consequently may be stationary in respect of the holder 5 and is provided with a slit 16a at a point corresponding to the X-ray source (Fig. 2). As the object to be photographed rotates and concurrently therewith the holder 5 with the film 17 moves linearly, as is indicated by arrows in Fig. 2, the film is exposed along its entire width.

Figure 4:
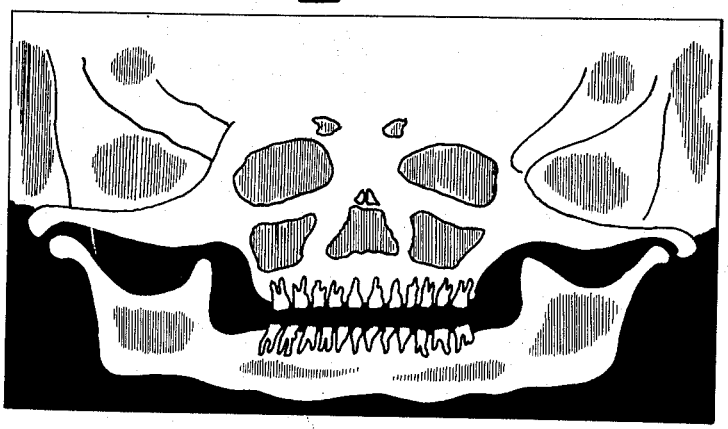
Fig. 4 shows a cephalophotograph of the frontalis of the head, taken according to the present method.

In Fig. 2 the face has been turned half-way and half of the film has been exposed. In this case of the picture begins at the right hand edge of the film from back of head and extends to the left hand edge of the film terminating again at back of head. Thus a kind of a "cephalograph" is obtained which resembles a map of the earth wherein the areas on opposite sides of the earth can be seen abreast in the same plane. Fig. 4 is a schematic illustration of a picture of the kind described, but, only of the frontalis of the head.

If the gear wheel 10 and the object to be photographed rotate in opposite directions the relative movement between object and film is slower than if the said are rotated in the same direction. It is to be understood that the rotation speed of the object to be photographed and the linear moving speed of the film can be varied in many different ways both absolutely as well as relatively to each other, and consquently, e. g., the exposure time can be determined according to the requirements set each time. In this way it is possible to photograph layers at different levels and, e. g., lung pictures can be taken in which inter alia the infundibula are quite clearly visible, but, hardly any signs of the encircling ribs can be detected. Obviously the different parts of the device can be moved in a manner other than that described by employing different means, wherefore the invention is not limited to the embodiment herein described.

Figure 3:
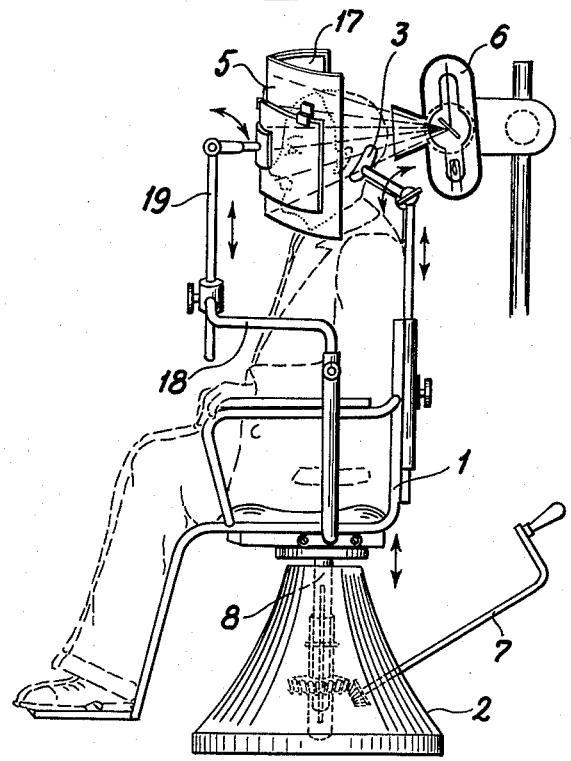
Fig. 3 is another form of the invention.

Fig. 3 shows by way of example an embodiment of a more simple construction by means of which only a half of the head can be X-ray photographed (Fig. 4). To an ordinary rotatable chair 1 is secured a turnable arm 18 which supports an appropriate, adjustable frame 19 for the holder 5. An X-ray film which may or may not be reinforced is arranged into the holder 5 shaped like a half cylinder or parabola. Should the nape support 3 not be made of material impermeable to X-rays it is removed. The film and the head to be photographed can be attached to each other in any suitable manner. Care must only be taken to make sure that the central axis of the head approximately coincides with the rotation axis of the chair. Then the chair is slowly turned so that the wall-like vertical ray bunch from the stationary X-ray source moves from one end of the holder to the other. On turning the chair about 180° a fairly good picture of the outermost layers of the head, i. e., those layers closest to the film are projected onto the film without any of the internal parts or bones on the opposite side of the head giving disturbing shades due to divergence of rays. Fig. 4 is a schematic illustration of a picture of the kind described, however, somewhat flattened at the top. Advantageously a film suitable for a half head picture of the kind described would measure 24 centimetres by 30 centimetres.

Naturally any prior known auxiliary means such as grids or the like can be arranged between the X-ray film and the object to be photographed. The rotation axis direction may vary between vertical and horizontal depending on the object to be photographed and the means used therefor. As has been mentioned before, in general, the X-ray photographing method according to the present invention can be carried out in many different ways without deviating from the scope and spirit of the invention.

I claim:

1. Device for X-ray photographing curved surfaces of an object comprising rotatable supporting means for the object, rotation axis for said supporting means, a stationary frame, a second axis rotatable by said first mentioned rotation axis, a gear wheel carried by the upper end of said second axis, a plate, guide rails in said frame along which the said plate is movable, a toothed bar in said plate meshing with said gear wheel for linearly moving said plate, and a film holder secured to said plate.

2. Device for X-ray photographing curved surfaces of an object comprising rotatable supporting means for the object, rotation axis for said supporting means, a stationary frame, a second axis rotatable by said first mentioned rotation axis, a gear wheel carried by the upper end of said second axis, a plate, guide rails in said frame along which the said plate is movable, a toothed bar in said plate meshing with said gear wheel for linearly moving said plate, and a film holder secured to said plate and adjustable in any direction.

3. Device for X-ray photographing curved surfaces of an object comprising rotatable supporting means for the object, rotation axis for said supporting means, a stationary frame, a second axis rotatable by said first mentioned rotation axis, a gear wheel carried by the upper end of said second axis, a plate, guide rails in said frame along which the said plate is movable, a toothed bar in said plate meshing with said gear wheel for linearly moving said plate, a film holder secured to said plate, a shield plate, and an adjustable arm joining said frame and said shield plate.

4. The method of photographing upon film with X-rays of curved surfaces of an object such as the human body, including the steps of placing the film relatively very close to said object, rotating said object for at least 180 degrees about a longitudinal axis of rotation, said axis passing substantially through the centre of said object, simultaneously directing a fixed narrow beam of X-rays through said object at said longitudinal axis of rotation, and simultaneously moving said film in the same direction and at an equal linear velocity with that of said curved surface of said object, and causing said X-ray beam to pass through said object, delimiting said beam after the passage to a relatively narrow band and causing said band to impinge upon said film.

References Cited in the file of this patent

UNITED STATES PATENTS

| Number | Name | Date |
|---|---|---|
| 1,408,559 | Zulauf | Mar. 7, 1922 |
| 2,396,069 | Zapp | Mar. 5, 1946 |
| 2,437,688 | Forssell | Mar. 16, 1948 |
| 2,476,776 | Smathers | July 19, 1949 |
| 2,492,520 | Bonnet | Dec. 27, 1949 |
| 2,511,097 | Bonnet | June 13, 1950 |
| 2,584,962 | Gross | Feb. 5, 1952 |

FOREIGN PATENTS

| Number | Country | Date |
|---|---|---|
| 670,322 | Germany | Jan. 15, 1939 |
| 700,466 | Germany | Dec. 20, 1940 |
| 944,914 | France | Nov. 15, 1948 |